Patented June 16, 1942

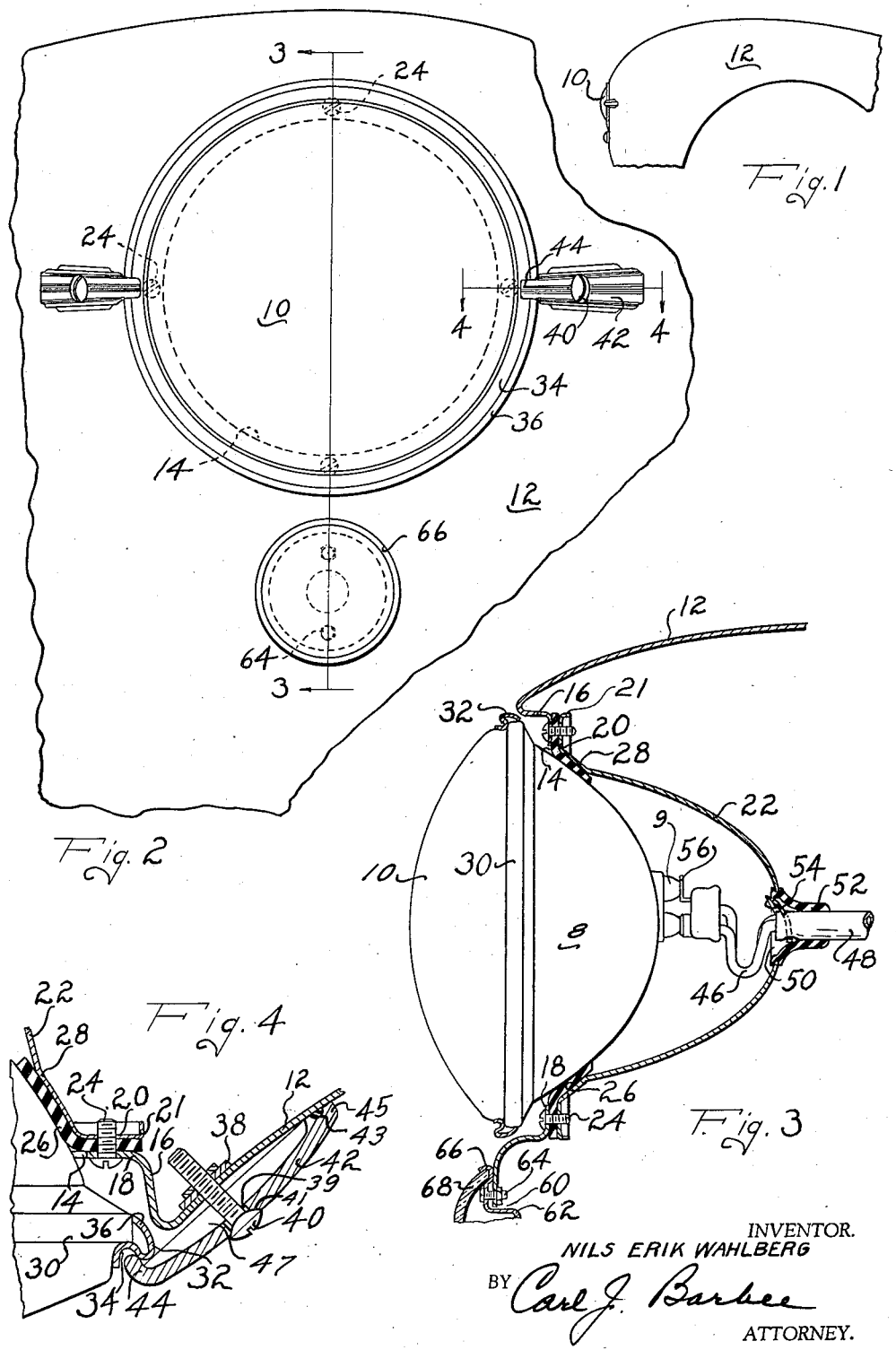

2,286,448

UNITED STATES PATENT OFFICE 2,286,448

LAMP MOUNT

Nils Erik Wahlberg, Kenosha, Wis., assignor to Nash-Kelvinator Corporation, Kenosha, Wis., a corporation of Maryland Application April 24, 1940, Serial No. 331,305

3 Claims. (Cl. 240—41.5)

This invention relates to lamp mounts and has particular reference to means for mounting a headlamp in an automobile.

It is an object of this invention to provide novel means for suporting a lamp lulb in an automobile, which means will be cheaper and easier to install than means known heretofore.

It is another object of this invention to provide means for mounting a lamp bulb in an automobile, which means will allow the position of said bulb to be changed for directing the rays of light from said bulb.

It is another object of this invention to provide means for mounting a bulb in an automobile, which means will both cushion said bulb from vibration and hold said bulb in a plurality of positions.

It is another object of this invention to provide means for mounting a bulb in an automobile, which means will both hold the bulb in position and seal its connections from dirt and moisture.

Other objects and advantages of this invention will be apparent from a consideration of the following description and attached drawings of which there is one sheet and in which Figure 1 represents a side elevation of a portion of an automobile fender having a lamp bulb installed therein;

Figure 2 represents a front elevation of the lamp bulb illustrated in Figure 1;

Figure 3 represents a vertical section taken along the plane indicated by the line 3—3 of Figure 2 and looking in the direction of the arrows; and, Figure 4 represents a section taken along a plane indicated by the line 4—4 of Figure 2 and looking in the direction of the arrows.

My invention deals with means for mounting a lamp bulb, of the type known to the automotive trade by the trade name "Sealed Beam," in a portion of an automobile. These bulbs consist of a parabolic back portion 8 having terminals 9 extending therethrough which support filaments within the lamp. The parabolic back portion 8 may be made of metal or glass and is silvered on the inside to form a reflector. The front of the back portion 8 is closed by a glass lens 10 which is fused to the back portion 8 or otherwise suitably sealed to form an air tight lamp unit that includes reflector, lens, filaments and terminals. I have shown the lamp to be installed in the forward wall of a fender 12, although it could obviously be installed at any point on the automobile where suitable supporting means, to be described later, are provided. I have shown the fender 12 to have an aperture 14 formed in its front wall and around which is formed the cylindrical flange 16 bent back from the forward wall of the fender. Flange 16 is then bent over in a flat annular flange 18 to which is bolted the flat flange 20 of a bowl member 22. The flange 20 is rolled back at its outer edge in a strengthening flange 21. The flanges 18 and 20 are secured together by means of metal screws 24 and retained between them is an annular gasket of rubber having a center portion 26 which extends inwardly from the metal flanges 18 and 20. The bowl member 22 may be conveniently formed by stamping from relatively light sheet metal and is formed with a tapered portion 28 near its mouth which is of approximately the same curvature as the parabolic back portion 8 of the lamp unit.

The lamp is formed with an annular rib 30 extending around its periphery where the back 8 and lens 10 are joined, and I have provided a metal rim 32 which is shaped to have a center groove 34 which fits against the front surface of the rib 30 and an outer backwardly extending flange 36 which is arranged to bear on the sides of the rib 30. On each side of the aperture 14 the fender 12 is provided on its under surface with thickening members 38 such as blocks of metal welded to the fender which along with the fender are drilled and tapped to receive screws 40 which serve to hold the bowed clips 42 to the fender. Clips 42 have a hooked inner end 44 which fits into the groove 34 in the forward surface of the metal rim 32 and outer ends 45 which rest against the fender 12. By placing the lamp member 10 in the aperture 14 with the rim 32 against the rib 30, the clips 42 may be drawn down with the screws 40, which will force the lamp member 10 against the gasket 26 and the tapered portion 28 of the bowl member 22. I have found that only two of the clips 42 are necessary to securely hold the lamp 10 in position since the friction between the glass of lamp member 10 and the rubber gasket 26 is sufficient to hold the lamp member against rotation or tilting within the bowl member 22. By loosening the clips 42 slightly the lamp member 10 may be rotated or tipped in the gasket 26 to obtain the proper aiming of the light rays from the lamp, and the unit may then be clamped in place by tightening the screws 40. The lamp 10 and the tapered portion 28 of the bowl 22 form a ball and socket fit so that any position of the lamp may be obtained.

More specifically, clips 42 are provided with a flat surface at 45 in which is placed a small rubber plug 43 which prevents the clip from scratching the fender 12. The hole 39 through which the screw 40 passes is countersunk in a spherical surface at 41 and the screw 40 has a mating spherical surface on the under side of its head. The hole 39 is larger than the shank of the screw 40 so that the clip 42 may tip about the end 45 as the hooked end 44 follows the various positions of the lamp retaining ring 32 without changing the alignment of screw 40. The head of the screw 40 will slide with respect to the spherical countersunk surface 41 in the clip without binding or bending the screw. The clip 42 may be provided with side flanges 47 for partially concealing the shanks of screws 40.

The wires 46, which supply current to the lamp, are brought into the bowl member 22 in a cable 48 passed through an aperture 50 in the back of the bowl member 22. The aperture is sealed by means of a flexible gasket 52 which fits around the cable 48 and has an annular groove engaging the edges of aperture 50. The cable is held from being pulled out of the gasket 50 by means of a lock disc 54 which is wedged around the cable 48 and cocked against the sides of the gasket 50. The aperture in the disc is off center so that the widest part of the disc 54 strikes the gasket 52 first and any movement tending to draw the cable 48 out of the gasket wedges the narrower part into the cable.

I wish to point out that the rubber gasket 26, which keeps the lamp unit 10 from moving, also cushions the lamp from vibration and prevents dirt and moisture from entering the bowl member 22 and fouling the contacts 56 which snap on to the external ends of the contacts 9.

Just below the aperture 14 (see Figure 3) the fender 12 is provided with a smaller aperture 60 in which is fastened the metal cup 62. Cup 62 is held in place by bolts 64 and forms the base for an auxiliary bulb (not shown) such as a parking light. The edges of the cup 62 are formed into an annular trough-shaped flange 66 which serves to retain a lens 68 for covering the parking bulb. The flange 66 may be made flexible so the lens 68 may be snapped in place or the lens itself may be made of flexible plastic material which can be deformed sufficiently to be snapped into place.

While I have described my invention in some detail, I intend this description to be an example only and not limiting my invention to which I make the following claims:

1. In combination with an automobile having a body, a panel member in said body defining an aperture, a flat flange formed around said aperture, a bowl member having a second flange formed around its rim, a sealed lamp unit having a curved back portion arranged to fit against an annular portion of said bowl member near said second flange, a flat rubber gasket positioned between the flanges around the rim of said bowl member and extending between said bowl member and said lamp unit, means securing the flange of said bowl member to said flange around the aperture in said panel member, and means secured to said panel member for holding said lamp unit against said gasket and bowl member.

2. In combination with a sealed lamp unit having a curved back surface, a supporting panel defining an opening adapted to pass the curved back of said lamp unit, deformable friction material secured around and extending into said opening, a bowl member secured to said panel about said opening for backing up said friction material, said friction material being positioned between said bowl member and said panel, said bowl member having a portion conforming in shape to the curved back of said lamp unit and bearing against said lamp unit through said friction material, the front surface of said lamp unit overlying the connection between said panel and said bowl member, and means for clamping said lamp unit to said bowl member.

3. In combination with a lamp unit having flanged reflector and lens portions sealed together and electrical terminals carried on said reflector unit, a supporting panel defining an aperture having an annular flange therearound, a bowl member having an annular flange therearound and secured to said first annular flange, an annular portion of said bowl member adjacent the flange of said bowl member conforming in shape to the shape of part of said reflector portion, a flat annular deformable gasket positioned between said flange on said panel and said flange on said bowl and extending partially over the mouth of said bowl, and means removably secured to said panel and bearing against said flanged lens portion for drawing said lamp unit into said bowl member whereby the interior portion of said gasket is deformed and pressed between said annular portion of said bowl and said reflector.

NILS ERIK WAHLBERG.